W. G. ANDREWS.
PROCESS OF TREATING FLOUR.
APPLICATION FILED MAY 20, 1914.
1,136,501.
Patented Apr. 20, 1915.
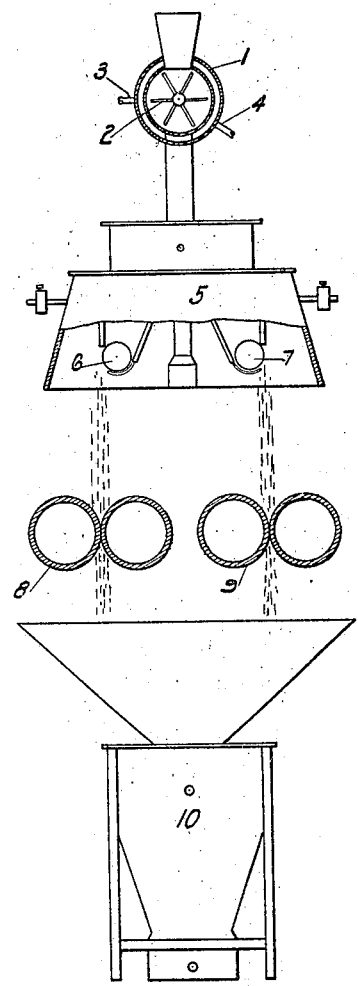
WITNESSES
INVENTOR:

UNITED STATES PATENT OFFICE.

WILLIAM G. ANDREWS, OF CHICAGO, ILLINOIS, ASSIGNOR TO HIMSELF, AND FREDERICK D. LARABEE, OF HUTCHINSON, KANSAS.

PROCESS OF TREATING FLOUR.

1,136,501.  Specification of Letters Patent.  Patented Apr. 20, 1915.

Application filed May 20, 1914. Serial No. 839,699.

*To all whom it may concern:*

Be it known that I, WILLIAM G. ANDREWS, a citizen of the United States, residing at Chicago, county of Cook, State of Illinois, have invented a certain new and useful Improvement in Processes of Treating Flour, and declare the following to be a full, clear, and exact description of the same, such as will enable others skilled in the art to which it pertains to make and use the same, reference being had to the accompanying drawings, which form a part of this specification.

It is well known that if the starch cells of flour are partially ruptured or a portion of the cells of the flour are ruptured, the capacity for absorbing and retaining moisture is increased and the quality of bread or other bakery products made from such flour is improved and such products will remain fresh much longer than those made of ordinary flour. Heretofore the rupturing or partial rupturing of starch cells in flour has been produced by subjecting the flour to the action of moisture and heat, the process most generally employed including the injection of steam into the flour to be treated. The use of steam has several objections among which is the difficulty of accurately regulating the amount of steam, while a vital objection is that a steam treatment or water treatment, in conjunction with heat, discolors the flour.

The object of my invention is to produce a simple and novel process of treating flour so as to rupture the starch cells therein to any desired extent without discoloring the flour but, on the contrary making the flour whiter than it was before being treated.

I have discovered that a sufficient rupturing of the starch cells of flour, particularly commercial wheat flour may be ruptured sufficiently by the application of simple heat and pressure while the flour is in its normally dry powdery state to make the yield in baked products greater, improve the texture of the product and cause the product to remain fresh longer than is the case where ordinary flour is used. Furthermore, the flour itself, and the product made therefrom, are both whiter than is the case where the flour has not been treated in accordance with my invention.

The flour may be treated at any time after having passed through the process of manufacture and therefore the treatment in accordance with my invention may follow as a last step in the completion of flour in the mill. On the other hand, since my invention is a process entirely distinct from the milling process, the flour may be treated after it has left the mill, if desired.

The simplest means for subjecting the flour to heavy pressure is to pass it in a thin stream through ordinary smooth rolls running at exactly the same speed so as not to exert a grinding or tearing force upon the material passing through the same, the flour and the rolls being both kept comparatively warm. The extent to which the starch cells are ruptured and the amount of whitening of the flour varies with the temperature at which the process is carried out. If the temperature be too high the life will be taken out of the flour and the treatment will be injurious rather than beneficial. My experience has been that the process may be most advantageously carried out at a temperature of from 100 degrees F. to 125 degrees F., the lower temperature being high enough to insure good results and the higher temperature being low enough to insure that the flour will not be deadened. It will of course be understood however that either a lower or a higher temperature than the limits specified may be employed.

In the accompanying drawings I have shown diagrammatically apparatus by means of which my invention may be carried out.

Referring to the drawing, 1 represents a receptacle, steam packeted or otherwise so that it may be heated. In the receptacle is a suitable stirrer, 2, which will stir the flour delivered into one end of the receptacle and gradually feed it to a discharge point at the other end so as to permit it to be heated uniformly throughout before being discharged from the receptacle. In the arrangement shown the receptacle is steam jacketed, the jacket being provided with a steam supply pipe, 3, and a discharge pipe, 4. From the receptacle the heated flour is delivered to a feeding device, 5. In the arrangement shown the feeding device contains two separated feed rolls or drums, 6 and 7, each of which discharges flour in a broad, thin stream. Beneath each feeding drum is a set of heavy smooth rolls, indicated at 8 and 9, held against each other with considerable pressure and run at exactly the same speed. These rolls may be made hollow for the reception of a heating medium. Beneath the rolls is a receiver, 10, for agitating the flour and, if desired, bolting it. The receiver may be an ordinary reel.

The receptacle 1, permits the flour to be heated uniformly to the desired temperature before being delivered to the rolls. The rolls may be kept at a uniform temperature by a properly controlled heating medium introduced into the interior thereof. If desired, the heating medium to the rolls may be shut off after the operation has continued for a long enough time to insure that the rolls will remain warm due to the load upon them. However, in starting the process, it is best that the rolls be heated because otherwise the flour would be chilled by coming in contact therewith.

The warm flour is fed down between the warm rolls in a thin stream so that the action of the heavy rolls is to crush the minute powdery flour particles. Any small pieces of fiber or dirt which may not have been removed from the flour during the process of its manufacture will be flattened between the heavy rolls so that when the flour reaches the reel, if a bolting operation is employed, the flattened foreign substances will be separated from the flour and leave the latter cleaner and purer than it originally was.

I claim:

1. The process of treating commercially finished flour which consists in subjecting it to the action of heat and pressure while in its normally dry powdery form.

2. The process of treating commercially finished flour which consists in rolling it under a heavy pressure while in its normally dry powdery form and while in a heated state.

3. The process of treating commercially finished flour which consists in rolling it under a heavy pressure while in its normally dry powdery form and while in a heated state, and then passing the flour through a reel.

4. The process of treating wheat flour which consists in rolling it under a heavy pressure while in its normally dry powdery form and in a dry heated state.

5. The process of treating wheat flour which consists in heating it while in its normally dry powdery form and then passing it through warm smooth rolls so as to subject it to heavy pressure.

6. The process of treating flour which consists in rolling it under a heavy pressure while in its normally dry powdery form and while heated to a temperature of from 100 degrees F. to 125 degrees F.

7. The process of treating ordinary flour which consists in subjecting the same in the dry state to the action of heat and pressure.

In testimony whereof, I sign this specification in the presence of two witnesses.

WILLIAM G. ANDREWS.

Witnesses:
WM. F. FRENDENREICH,
RUTH E. ZETTERVALL.